(12) United States Patent
Blaschke et al.

(10) Patent No.: US 6,367,347 B1
(45) Date of Patent: Apr. 9, 2002

(54) SWITCH FOR BICYCLE SPEED-CHANGING GEAR

(75) Inventors: Georg Blaschke, Geldersheim; Robert Wessel, Würzburg, both of (DE)

(73) Assignee: Sram Deutschland GmbH, Schweinfurt (DE)

( * ) Notice: Subject to any disclaimer, the term of this patent is extended or adjusted under 35 U.S.C. 154(b) by 0 days.

(21) Appl. No.: 09/509,892
(22) PCT Filed: Jun. 1, 1999
(86) PCT No.: PCT/EP99/03794
  § 371 Date: Jul. 6, 2000
  § 102(e) Date: Jul. 6, 2000
(87) PCT Pub. No.: WO00/07871
  PCT Pub. Date: Feb. 17, 2000

(30) Foreign Application Priority Data

Aug. 4, 1998 (DE) .......................... 198 35 118
Apr. 23, 1999 (DE) .......................... 199 18 520

(51) Int. Cl.[7] .............................. F16C 1/10; G05G 13/00
(52) U.S. Cl. .......................... 74/502.2; 74/475; 74/489; 74/505; 74/506; 74/527
(58) Field of Search ........................ 74/489, 505, 502.2, 74/506, 475, 527; 474/80

(56) References Cited

U.S. PATENT DOCUMENTS 5,102,372 A * 4/1992 Patterson et al. ............. 474/80
5,241,877 A * 9/1993 Chen ............................ 74/489
5,315,891 A * 5/1994 Tagawa ....................... 74/489
5,476,019 A * 12/1995 Cheever et al. ............... 74/506
5,524,501 A * 6/1996 Patterson et al. ............. 74/475
5,615,580 A    4/1997 Chen et al.
5,732,598 A * 3/1998 Shoge et al. .................. 74/475

FOREIGN PATENT DOCUMENTS

| CN | 282700 | * 8/1998 | ................ 74/502.2 |
| DE | 1 033 063 | 12/1958 | |
| DE | 9015515.7 | 3/1991 | |
| DE | 19918520 A1 | 2/2000 | |
| GB | 489820 | * 1/1939 | ................ 74/502.2 |
| GB | 649009 | * 1/1951 | ................ 74/502.2 |
| GB | 786426 | * 11/1957 | ................ 74/502.2 |
| TW | 84204379 | 8/1996 | |

* cited by examiner

Primary Examiner—Vinh T. Luong
(74) Attorney, Agent, or Firm—Liniak, Berenato, Longacre & White

(57) ABSTRACT

A shift device for actuating at least one gear mechanism on a bicycle, comprising a housing for securing the shift device on the bicycle, a grip element for actuating the shift device, a rotary element and a cable storage device, in particular a spool for winding up a cable to actuate the gear mechanism where the rotary element is connected to the spool and has at least one detent pawl which engages in detent toothing of the housing. It is advantageous that the drive feature on the grip element takes the rotary element along directly in one direction of rotation, whereas the movement of the rotary element in the opposite direction of rotation is effected by release of the detent pawl.

14 Claims, 3 Drawing Sheets

SWITCH FOR BICYCLE SPEED-CHANGING GEAR

BACKGROUND OF THE INVENTION

1. Field of the Invention

The invention relates to a shift device for actuating at least one gear mechanism on a bicycle in accordance with the preamble of claim 1.

2. Description of Related Art

A shift device for controlling bicycle gear mechanisms such as derailleur shift mechanisms or multispeed hubs has, been disclosed by German Utility Model DE 90 15 515 U1, which has a housing comprising a housing plate and a housing cover which are held together by a central fastener, furthermore has a cable pulley, which is wound onto the Bowden cable leading to the bicycle gear mechanism, and finally has a shift lever which is held in a central position by a double-acting torsion spring and, when actuated in either of two directions of rotation, in each case shifts to the next gear, there being arranged on the lever two detent pawls which act in opposite directions, as regards the direction of rotation, on a ratchet wheel which is connected in a rotationally fixed manner to the cable pulley, one of the two detent pawls rotating the ratchet wheel by its engagement with the latter, while the other detent pawl is simultaneously disengaged.

SUMMARY OF THE INVENTION

Such an arrangement of the detent pawls, which act inwards in opposite directions on a ratchet wheel, is a traditional solution which is frequently employed for gear changing in bicycle hubs and shift devices but is too complex for use in a shift device and, especially, is too bulky in terms of its space requirements. The solution proposed in accordance with the present invention is limited to a single detent pawl which controls a bicycle gear mechanism in conjunction with the tensile force of a cable, the detent pawl being able to engage in detent toothing in a housing when the rotary motion is interrupted counter to the direction of the cable tension. Gear changing in the opposite direction of rotation, i.e. when the shift device ought to yield to the cable tension of the cable, is achieved by simply lifting out the detent pawl, the cable tension rotating a rotary element with a spool back until the detent pawl can reengage in the detent toothing of the housing. As can be seen, gear changing is performed against the tension in the cable in one direction of rotation, the rotary element with the spool being twisted in a process involving the expenditure of force, whereas, in the opposite direction of rotation, it is merely a matter of exercising control, the detent pawl merely being lifted out of its detent toothing in the housing by means of a release projection on a grip element. The cable tension in the cable preloaded by the bicycle gear mechanism corresponds to a preload on the rotary element in the direction of cable release, with the result that the detent pawl is pulled abruptly from the release position in the detent toothing to the next tooth of the detent toothing, this corresponding to one gear ratio in the gear shift. The gear change can be concluded before the shift operation by turning the grip element is ended. The shifting of the bicycle gear mechanism in the direction of winding up thus corresponds to a forcible adjustment of the bicycle gear mechanism, e.g. a derailer shift, which is preferably used to swivel a bicycle chain from a smaller gear ring to a larger gear ring since it is more difficult to transfer the chain in this direction than in the opposite direction, namely when transferring the chain from a larger gear ring to a smaller gear ring.

However, the grip element can also be used to preload the rotary element in the direction of cable release, this being accomplished by virtue of the fact that, when the release projection is moved by rotating the grip element in the direction of the detent pawl, the spring element is already preloaded and, when the detent pawl disengages, propels the latter into the next notch of the detent toothing by means of the sum of the preloading force of the spring element and the tension in the cable, thereby turning the rotary element further by the rotational angle of one gear.

It is thus the object of the invention to provide a shift device which, for reasons of cost, comprises a minimum number of components, in particular a single detent pawl, and is nevertheless capable of meeting all the requirements on a twist-grip shift device controlled by detent pawl.

The way in which this object is achieved is described in the defining part of the main claim. Refinements will be found in the subclaims.

BRIEF DESCRIPTION OF THE DRAWINGS

An exemplary embodiment of a shift device for actuating a bicycle gear mechanism will be explained with reference to four schematized drawings, in which.

DETAILED DESCRIPTION OF THE PREFERRED EMBODIMENTS

Figure 1:
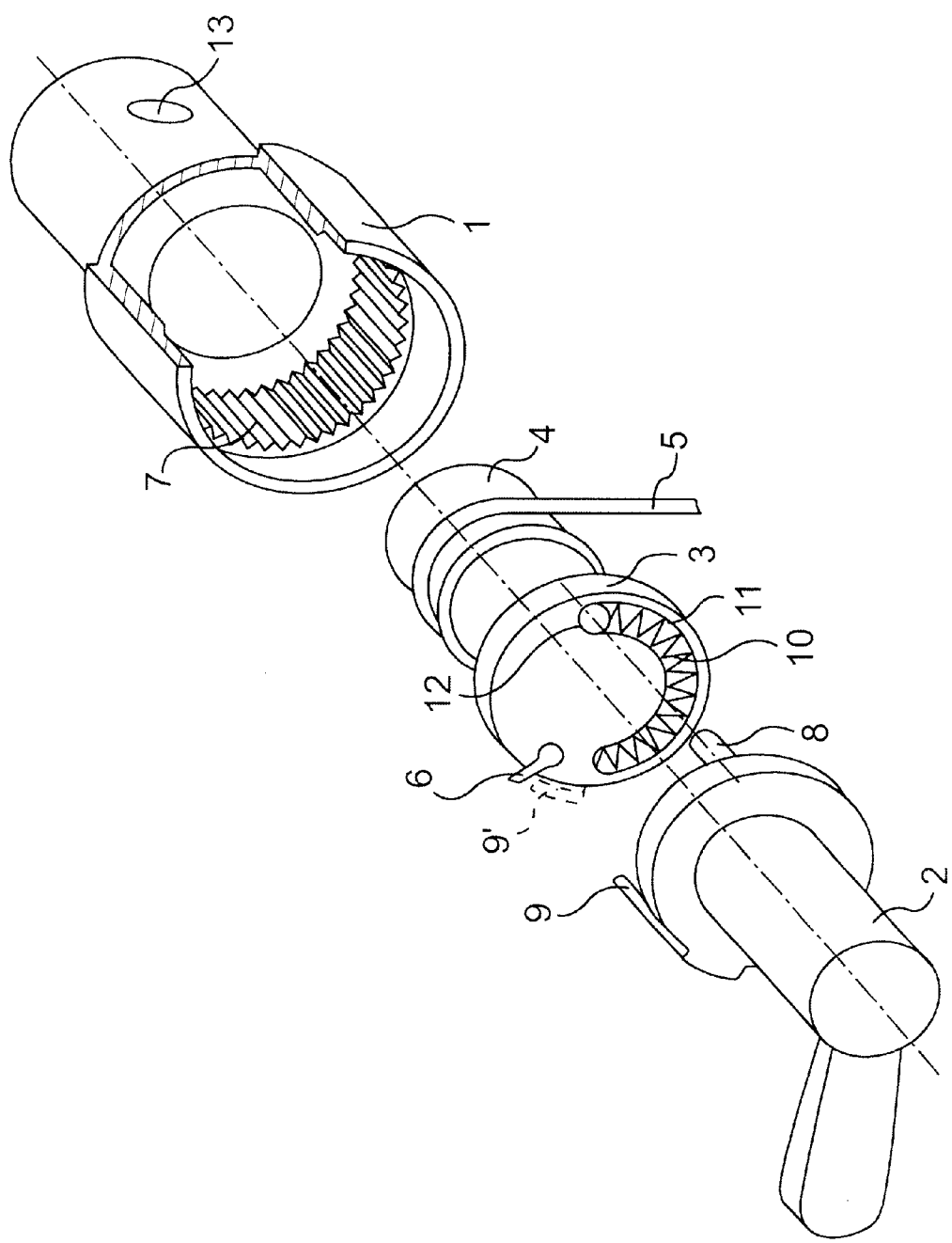
FIG. 1 shows a shift device comprising a grip component, a rotary component with a spool in a housing in exploded representation.

If 1 denotes a housing of a shift device for actuating a bicycle gear mechanism, this housing can be attached to the bicycle, in particular the bicycle handlebars, and is designed in such a way that it accommodates a rotary component 3 which has a spool 4 around which a cable 5 is wrapped, the cable 5 being secured at one end on the spool 4. The housing 1 furthermore has, on an inner circumference, detent toothing 7 which can interact with a detent pawl 6 which is pivotably mounted on the rotary element 3 and is spring-loaded against this detent toothing 7. The detent toothing 7 has teeth, the spacing between which preferably in each case represents one gear ratio of the bicycle gear mechanism. Thus if the rotary component 3 is secured in the housing 1, the cable 5 will emerge from this housing 1 through a cable exit opening 13, it being possible to bring the detent pawl 6 together with the detent toothing 7. In this installation condition, the rotary element 3 can be twisted in the direction of rotation for winding up the cable and the detent pawl 6 runs over the detent toothing 7. If the direction of rotation is to be in the direction of release of the cable 5, the detent pawl 6 must be lifted out of the detent toothing 7. The spool 4 is subject to a torque caused by the cable tension which the cable 5 produces due to spring preloading in the bicycle gear mechanism. Thus if the detent pawl 6 is lifted out, the rotary element 3 rotates onward with the spool 4 in the direction of cable release.

Figure 6:
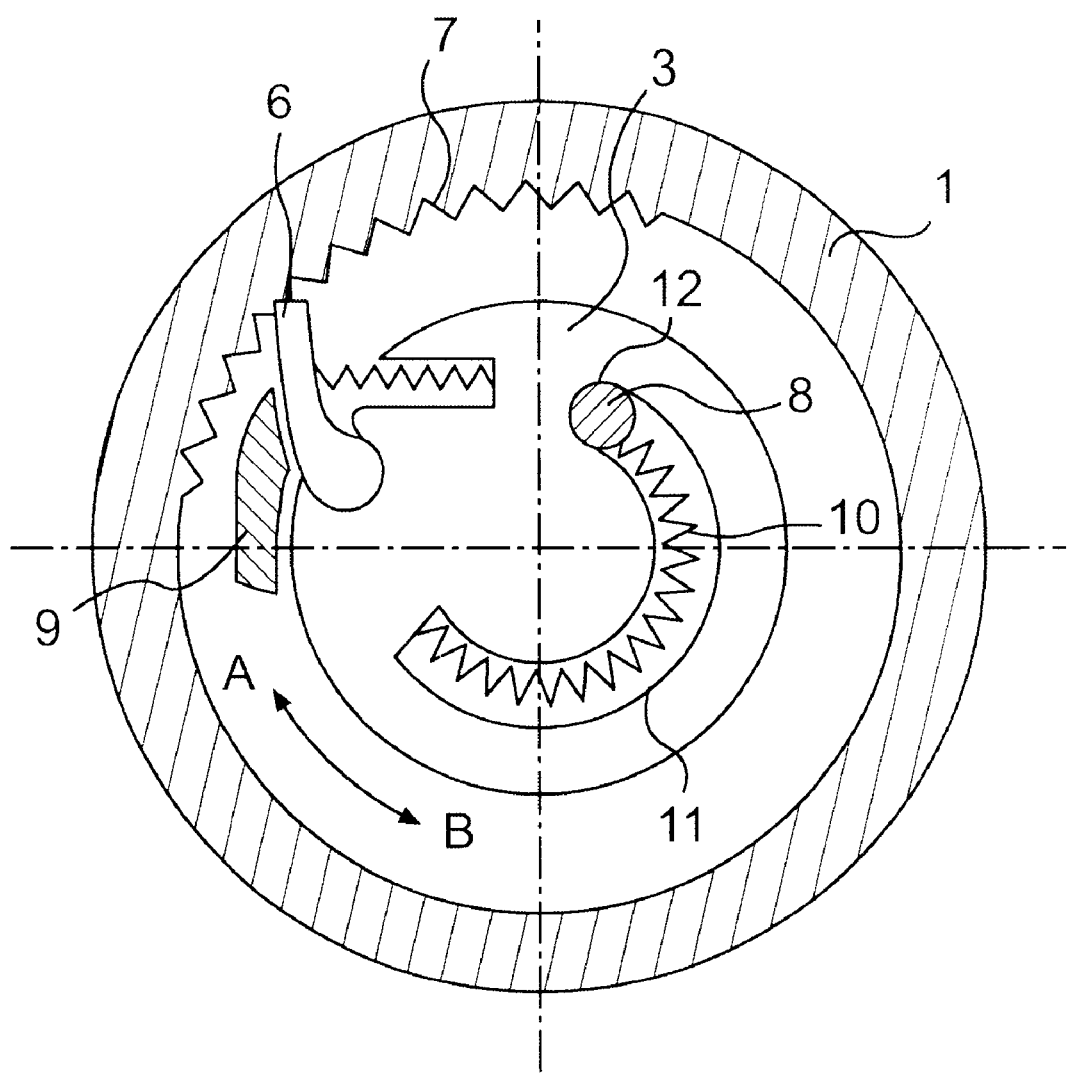
FIG. 6 shows the detent pawl engaged with the detent toothing.

As best shown in FIG. 6, the rotary element 3 is assigned a grip element 2 which has a drive feature 8 and a release projection 9. A spring element 10 is inserted in a guide slot 11 in the rotary element 3 in such a way that the drive feature 8 is pressed against a stop 12 in the direction of winding up the cable (direction 'B' in FIG. 6) when the rotary element 3 is moved in the direction of winding up the cable. If the rotary element is moved in the direction of cable release (direction 'A' in FIG. 6), the drive feature 8 comes into contact with the spring element 10, which it can compress when the grip element 2 is twisted in the direction of cable release. In the installation condition, the release projection 9 has a position 9' which is in a particular angular relationship to the position of the drive feature 8 in relation to the stop 12 and the spring element 10. This angular relationship is designed so that, when a shift operation in the direction of cable release is performed at the grip element 2, the spring element 10 is compressed and the drive feature 8 moves away from the stop 12. During this movement, the release projection 9 will simultaneously move in the direction of the detent pawl 6, the distance between the position 9' of the release projection 9 and the detent pawl 6 approaching zero in the process. If rotation is continued, the detent pawl 6 is lifted out and the rotary element 3 is propelled in the direction of cable release into the next notch of the detent toothing 7 by the sum of the forces, namely the spring force of the now preloaded spring element 10 and the tensile force of the cable 5. The shift operation thus takes place suddenly and abruptly, thus producing a prompt gear-change response in the bicycle gear mechanism.

In very general terms, the spring element 10 is a spring energy store acting in the direction of cable release as regards the interaction of the grip element 2 with the rotary element 3, and this means that the spring element 10 can also be embodied as a spiral spring around the axis of rotation of the rotary element 3. The spring element 10 shown in FIG. 1 should thus be taken to represent one of a multiplicity of possible rotation springs, the important point here being not so much the design of the spring but its action in combination with the cable tension in the cable 5.

For shifting the bicycle gear mechanism in the direction of winding up the cable, the detent pawl 6 and the tooth shape of the detent toothing in the housing 1 can be designed in such a way that the detent pawl 6 engages in the detent toothing 7 of the next gear only when a certain shift overtravel has been achieved. Instances of shift overtravel are known and are required in many cases in derailer shift mechanisms, in which the bicycle chain is usually reluctant to climb from a smaller gear ring to a larger gear ring during shifting.

Figure 2:
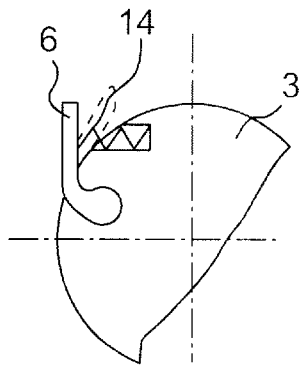
FIG. 2 shows the rotary component with a detent pawl, which is spring-loaded.
Figure 3:
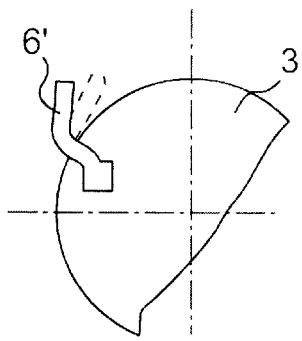
FIG. 3 shows the rotary component with an inherently resilient detent pawl, which is fitted into a form-fitting recess in the rotary component.
Figure 4:
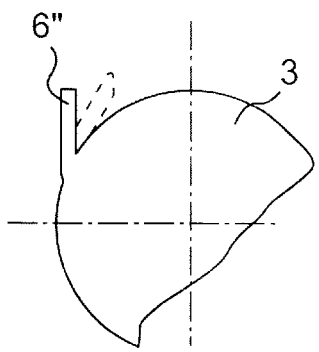
FIG. 4 shows the rotary component with an integrally formed detent pawl.

According to FIGS. 2, 3 and 4, various solutions to the connection of a detent pawl 6 to the rotary element 3 are proposed.

According to FIG. 2, the detent pawl 6 is rotatably mounted in the rotary element 3 and is spring-loaded outward in the direction of engagement with the detent toothing (not shown here) by a detent-pawl spring 14.

According to FIG. 3, an inherently elastic detent pawl 6' is inserted into a matching opening in the rotary component 3, giving a position for the detent pawl 6' such that, in the installation condition, it is bent slightly inward, giving it its spring force for pivoting into the detent toothing 7 of the housing 1.

According to FIG. 4, a detent pawl 61" is proposed which is connected integrally to the rotary element 3 and, like the detent pawl 6' in accordance with FIG. 3, is given the preloading toward the detent toothing 7 by constructional means.

Figure 5:
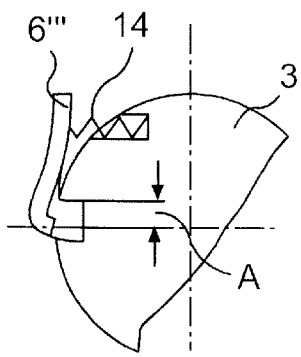
FIG. 5a and 5b show the rotary component with a detent pawl which is connected to the rotary component by way of idle travel and movement of the detent pawl during shift overtravel.

According to FIGS. 5a and 5b, a detent pawl 6''' is proposed which is in driving connection with the rotary element 3 in a manner which includes idle travel A. The detent pawl 6''' is arranged inside the housing 1 which surrounds the rotary element 3 such that the detent pawl 6''' cannot move radially away from the idle travel A. The idle travel A is traversed by the rotary element in the direction of rotation for winding up the cable before the detent pawl 6''' is taken along. When the rotary component is rotated in a counter clockwise direction, the detent pawl 6''' is frictional engaged with the detent toothing 7, the frictional forces derived from the spring 14. As the rotary element is further wound, the detent pawl 6''' first takes up the idle travel A before moving relative to the detent teeth 7. Once the idle travel A has been traversed as seen in FIG. 5b, the detent pawl''' slips over the top of a detent tooth 7 and comes into the space between the detent teeth 7. After a short unloading in the clockwise direction to reclaim the idle travel A distance, the detent pawl 6''' fully engages with a detent tooth 7 to lock into position. The idle travel A allows for the rotary element to take up more cable 5 before enabling engagement of the next detent tooth 7. The shift travel included with the gear mechanism by virtue of the idle travel A is not sufficient to engage the following gear ratio but rather ensures reliable transfer of a drive chain from smaller to larger chain wheels when shifting, particularly in the case of derailleur shift mechanisms. This feature will avoid accidental shifting by an incremental change in the counter clockwise direction.

What is claimed is:

1. A shift device for actuating at least one gear mechanism on a bicycle, comprising:
   a housing (1) for securing the shift device on the bicycle:
   a grip element (2) mounted on and engaged over the outside of the handlebar and rotatable about a handle-bar axis for actuating the shift device;
   a rotary element (3); and
   a cable storage device, comprising a spool (4) for winding up a cable (5) to actuate the gear mechanism, wherein the rotary element (3) is connected to the spool (4) and has at least one detent pawl (6, 6', 6",6''') which engages a detent toothing (7) of the housing (1) to prevent rotation of the rotary element in a cable release direction, the rotary element (3) preloaded in the direction of rotation for release by a spring element (10) when the detent pawl (6, 6', 6", 6''') is engaged with the detent toothing.

2. The shift device as claimed in claim 1, wherein the grip element (2) engages in the rotary element (3) by means of a drive feature (8).

3. The shift device as claimed in claim 2, wherein the drive feature (8) on the grip element (2) takes the rotary element (3) along a cable winding direction of rotation, whereas the movement of the rotary element (3) in the cable release direction of rotation is effected by release of the detent pawl (6, 6', 6", 6''').

4. The shift device as claimed in claim 3, wherein the rotary element (3) is preloaded in the direction of rotation for release by a spring element (10) when the detent pawl (6, 6', 6", 6''') is activated.

5. The shift device as claimed in claim 1, wherein the grip element (20 further comprises a release projection (9) to lift the detent pawl (6) out of engagement with the detent toothing (7).

6. The shift device as claimed in claim 1, wherein the spring element (10) is disposed between the grip element (2) and the rotary element (3).

7. The shift device as claimed in claim 1, wherein the detent pawl (6, 6', 6", 6''') is mounted on the rotary element (3) and is spring-loaded against the detent toothing (7) in the housing (1) by a detent-pawl spring (14).

8. The shift device as claimed in claim 1, wherein the detent pawl (6') is connected to the rotary element (3), the detent pawl (6) having a resilient property for resilient engagement in the detent toothing (7).

9. The shift device as claimed in claim 1, wherein the detent pawl (6') provided with a resilient property is fitted on the circumference of the rotary element (3) such that when the detent pawl is positioned in the shift device, the detent pawl can interact under preloading with the detent toothing (7).

10. The shift device as claimed in claim 1, wherein the detent pawl (6") is produced from a plastic material and is integrated with the rotary element (3).

11. The shift device as claimed in claim 1, wherein the detent pawl (6''') is spring-loaded against the detent toothing (7), being in driving connection with the rotary element (3) to provide a shift overtravel including an idle travel (A).

12. The shift device as claimed in claim 1, wherein control of the detent pawl (6, 6', 6", 6''') in the direction of release of the cable (5) is performed such that the spring element (10) is preloaded by a certain amount of the travel of a shift step when the release projection (9) lifts the detent pawl (6) out of the detent toothing (7).

13. The shift device as claimed in claim 1, wherein the detent pawl independently moves in a cable winding direction to engage the detent toothing and, upon application of an external force, said detent pawl disengages from the detent toothing in the cable release direction.

14. The shift device as claimed in claim 13, wherein a release projection is located between the housing and the rotary element and moves along an outer circumferential surface of the rotary element.

* * * * *

UNITED STATES PATENT AND TRADEMARK OFFICE
CERTIFICATE OF CORRECTION

PATENT NO. : 6,367,347 B1
DATED : April 9, 2002
INVENTOR(S) : Blaschke et al.

It is certified that error appears in the above-identified patent and that said Letters Patent is hereby corrected as shown below:

Column 4,
Lines 57-60, please cancel Claim 4.
Line 62, cancel "20" and insert -- 2 --.

Signed and Sealed this

Fifteenth Day of October, 2002

Attest:

JAMES E. ROGAN
Attesting Officer
Director of the United States Patent and Trademark Office